Dec. 19, 1933.                O. C. KREIS                1,939,855
                                ENGINE
                          Filed May 3, 1930

INVENTOR.
Oscar C. Kreis
BY
                                               ATTORNEY.

Patented Dec. 19, 1933

1,939,855

UNITED STATES PATENT OFFICE 1,939,855

ENGINE

Oscar C. Kreis, Detroit, Mich., assignor to Continental Motors Corporation, Detroit, Mich., a corporation of Virginia Application May 3, 1930. Serial No. 449,452

3 Claims. (Cl. 74—6)

My invention relates to engines and more particularly to a vibration damper structure that is preferably secured to the front end of the crankshaft for damping out vibrations set up in the crankshaft of an internal combustion engine.

In engines of the multi-cylinder type experience has shown that vibration dampers customarily employed and generally known as the friction type have not proved to be entirely satisfactory. This is largely due to difficulty in actual manufacturing practice of accurately machining and assembling the damper on the crankshaft front end so that it will rotate in a true plane perpendicular to the crankshaft axis; further difficulties lying in the failure of the friction type damper to damp out vibrations caused by deflections of the portion of the crankshaft front end beyond the usual forward crankshaft bearing. It is an object of this invention to provide an inertia member floatingly supported from the crankshaft whereby the inertia member may readily adjust itself without setting up vibrations in the crankshaft.

It is the object of my invention to facilitate the manufacture and assembly of a vibration damper in which the inertia member is universally supported, by providing a structure which may be readily assembled with a minimum of time and labor.

A further object of my invention is to facilitate the damping of lateral and torsional vibrations generated in the crankshaft of an internal combustion engine by providing a full floating inertia member, which is yieldingly supported around the driving hub structure in spaced relation therewith.

A still further object in my invention is to provide a damper structure of maximum efficiency for damping out both torsional and lateral vibrations generated in the engine crankshaft by providing one or more and preferably a plurality of yieldable driving intermediaries between the hub structure and inertia member, that provide a yielding connection therebetween, and also space the inertia member from the driving hub structure.

For a more detailed understanding of my invention, reference may be had to the accompanying drawing which illustrates one form which my invention may assume, in which.

Figure 3:
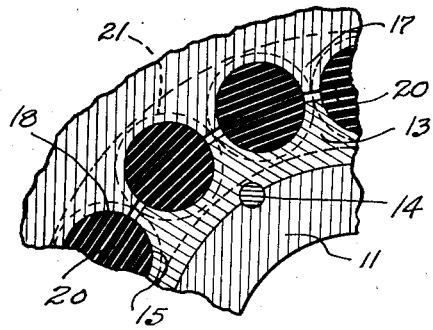
Figure 3 is a detail transverse sectional view taken substantially on the line 3—3 of Figure 1.

The vibration damper illustrated in the accompanying drawing is adapted to be secured to the front end of the engine crankshaft A in the usual manner by means of a key 10, this key fixing the hub portion 11 of the damper structure to the crankshaft. The hub is preferably constructed to provide a pulley structure 12, the forward end of the hub having a diameter considerably less than the diameter of the pulley and arranged to support a driving ring 13 which may be secured to the hub in any suitable manner, but preferably by the dowel pin 14 shown in Figures 1 and 3. The outer peripheral surface of the driving ring is provided with a plurality of transverse semi-circular grooves 15, said grooves preferably arranged closely adjacent to each other about the periphery of the ring.

An inertia member is so constructed as to be supported concentrically with respect to the driving hub structure in spaced relation therewith, this inertia member comprising a flywheel structure 16 having an inwardly extending flange portion 17, the said flange portion being provided with a plurality of transverse semi-circular grooves 18. It is noted that the grooves 18 are complementary to the grooves 15 carried by the driving ring 13 to provide substantial circular recesses for receiving driving intermediaries.

Figure 4:
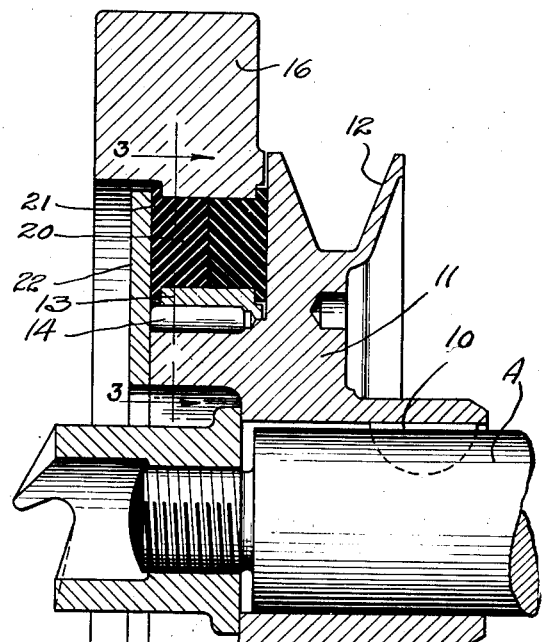
Figure 4 is a detail perspective view of one of the rubber spool parts which serve as the driving intermediary.
Figure 2:
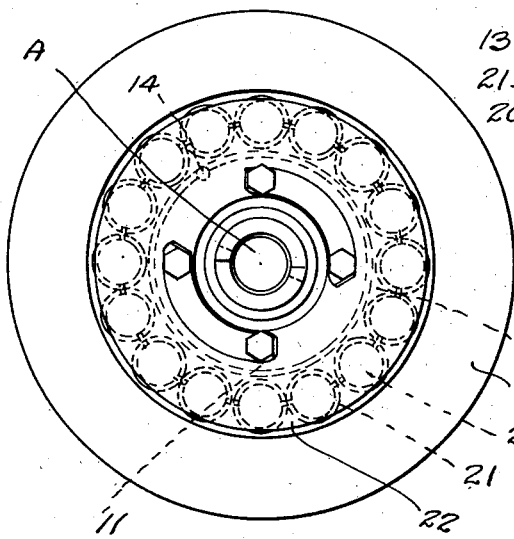
Figure 2 is a front elevational view thereof.
Figure 1:
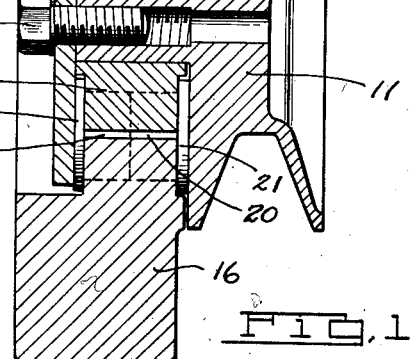
Figure 1 is a longitudinal sectional view through a vibration damper constructed in accordance with my invention, and showing the same mounted on the front end of an engine crankshaft.

The driving intermediary is assembled between the driving hub structure and the inertia member, preferably being interposed directly between the driving ring and the inwardly extending flange 17 of the inertia member. These driving intermediaries each consist of a yieldable insert or spool member, and are preferably constructed of a resilient material such as rubber. Each of these driving intermediaries comprise a hub portion 20, that is preferably circular in cross section and a head portion or flange 21 having a diameter greater than the diameter of the hub portion. Preferably each spool is constructed of two like parts, as illustrated in Figure 4, and it is located in a circular recess formed by a pair of complementary grooves carried by the driving ring and inertia member as illustrated in Figure 1. The enlarged head portions or flanges 21 of the driving intermediary are arranged to engage the side walls of the driving ring and the inwardly extending flange 17 of the inertia member, and thereby space the inertia member from the driving hub and the end plate 22, which is secured to the driving hub by means of bolt 23 or other suitable fastening device.

The driving intermediary is thus retained in place by the end plate 22 and the inertia member, which has the inwardly extending flange 17 that is projected within the groove of the driving hub structure is also retained in place by said end plate 22. The built up driving hub structure comprises the hub 11, the ring 13 and the plate 22, these parts being assembled to provide an annular groove extending circumferentially around the driving hub, in which the driving intermediaries are supported. The flange 17 of the inertia member is so constructed as to be located on this annular groove and to be engaged by the yieldable driving intermediaries.

It will be noted that these yieldable driving intermediaries engaged with the hub structure and the inertia member will yield when the crankshaft is subjected to torsional vibrations, and because of the fact that the inertia member is spaced axially from the driving hub structure by the flanges or heads 21 of the rubber spools, lateral vibrations may be also absorbed as the inertia member tends to compress the yieldable flanges 21 when subjected to these lateral vibrations. The gyroscopic forces of the flywheel or inertia member tends to cause the inertia member to revolve in a plane perpendicular to the crankshaft axis, and to overcome the forces which tend to throw the inertia member out of this plane, the yieldable driving means interposed between the inertia member and driving hub structure, permitting this relative axial movement of the inertia member and driving hub structure.

It may be further noted that the flanges 21 of the driving intermediaries preferably contact with each other, thus providing substantially a continuous yieldable annular ring around the damper structure. It may be also noted that the inner diameter of the inertia member is somewhat greater than the outer diameter of the driving ring 13 and therefore this inertia member may be aptly described as being a full floating inertia member. It may be further noted that the diameter of the spool like driving intermediaries have a diameter that is slightly greater than the diameter of the recesses, in which each of said driving intermediaries is fitted. Thus the said spool parts are actually pressed into the complementary recesses carried by the driving ring and inertia member.

Although I have illustrated but one form of my invention and have described in detail but a single application thereof, it will be apparent to those skilled in the art to which my invention pertains, that various modifications and changes may be made therein without departing from the spirit of my invention or from the scope of the appended claims.

What I claim as my invention is:

1. A vibration damper for engine crankshafts, comprising a driving hub structure fixed to the crankshaft and provided with an annular groove extending around the hub structure and opening radially outwardly, an inertia member surrounding said hub structure and having an inwardly extending annular flange located within said annular groove carried by the hub structure, said flange being of less width than the groove and a yieldable driving intermediary within said groove and having peripheral portions constructed to engage both the inertia member and the hub structure to interlock the same together and to yieldingly resist relative circumferential movement between said hub structure and inertia member, said yieldable driving intermediary provided with integral portions extending between the side walls of said groove and the side faces of the flange carried by said inertia member.

2. A vibration damper for engine crankshafts, comprising a driving hub structure fixed to the crankshaft and provided with an annular groove extending around the hub structure, an inertia member surrounding said hub structure and having an inwardly extending annular flange located within said annular groove carried by the hub structure, said flange being of less width than the groove, and a plurality of yieldable spool like driving intermediaries engaged with the inertia member and the hub structure to yieldingly resist relative circumferential movement of said hub structure and inertia member, said spool like driving intermediaries each provided with enlarged flanges at each end arranged to extend between the side walls of said groove and the side faces of the flange carried by said inertia member to yieldingly resist movement of the inertia member axially of the hub structure.

3. A vibration damper for engine crankshafts, comprising a hub structure fixed to the crankshaft, a full floating inertia member concentrically surrounding said hub structure and spaced therefrom, the adjacent spaced faces of said inertia member and said hub structure each provided with complementary semi-circular recesses forming substantial circular recesses after assembly of the hub structure and inertia member, and divided yieldable spool like driving intermediaries located in said circular recesses, the driving intermediary parts each comprising a shank portion having an initial diameter greater than that of the circular recess and an enlarged head at one end, said parts pressed into the opposite open ends of said circular recesses.

OSCAR C. KREIS.